(12) United States Patent
Handing et al.

(10) Patent No.: US 7,823,939 B2
(45) Date of Patent: Nov. 2, 2010

(54) CRASH BOX

(75) Inventors: Christian Handing, Langenberg (DE); Jochen Dörr, Bad Driburg (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 12/410,862

(22) Filed: Mar. 25, 2009

(65) Prior Publication Data
US 2009/0243313 A1    Oct. 1, 2009

(30) Foreign Application Priority Data
Mar. 26, 2008   (DE) ................ 10 2008 015 891

(51) Int. Cl.
*B60R 19/24* (2006.01)
*B60R 19/34* (2006.01)
(52) U.S. Cl. .................. 293/133; 293/155; 188/374
(58) Field of Classification Search ............... 293/133, 293/155, 132; 188/374, 371
See application file for complete search history.

(56) References Cited

U.S. PATENT DOCUMENTS

| | | | | |
|---|---|---|---|---|
| 4,572,022 A | * | 2/1986 | Mettler | 74/492 |
| 5,427,214 A | * | 6/1995 | Prottengeier et al. | 188/374 |
| 5,718,131 A | * | 2/1998 | Bobbitt, III | 70/184 |
| 7,188,877 B2 | * | 3/2007 | Gonzalez et al. | 293/133 |
| 7,192,067 B2 | * | 3/2007 | Hansen | 293/133 |

FOREIGN PATENT DOCUMENTS

| | | |
|---|---|---|
| DE | 40 28 164 A1 | 1/1992 |
| DE | 93 10 036 U1 | 10/1993 |
| DE | 43 45 550 C2 | 1/1994 |
| DE | 195 37 205 C2 | 4/1997 |
| DE | 195 37 206 A1 | 4/1997 |
| DE | 299 07 513 U1 | 10/1999 |
| DE | 100 14 469 A1 | 10/2001 |
| DE | 10 2004 036 929 A1 | 3/2006 |

* cited by examiner

*Primary Examiner*—Dennis H Pedder
(74) *Attorney, Agent, or Firm*—Henry M. Feiereisen; Ursula B. Day (57) ABSTRACT

A crash box for installation between a bumper beam and a side rail of a motor vehicle includes an outer tube, and an inner tube which is held inside the outer tube, with the outer and inner tubes being movable in relation to one another. At least one of the inner and outer tubes is provided with a coat of varnish at least in a contact area between the outer pipe and the inner pipe.

23 Claims, 5 Drawing Sheets

025EE# CRASH BOX

CROSS-REFERENCES TO RELATED APPLICATIONS

This application claims the priority of German Patent Application, Serial No. 10 2008 015 891.7, filed Mar. 26, 2008, pursuant to 35 U.S.C. 119(a)-(d), the content of which is incorporated herein by reference in its entirety as if fully set forth herein.

BACKGROUND OF THE INVENTION

The present invention relates to a crash box for installation between a bumper beam and a side rail of a motor vehicle.

The following discussion of related art is provided to assist the reader in understanding the advantages of the invention, and is not to be construed as an admission that this related art is prior art to this invention.

A bumper structure is typically mounted to the front or rear of a motor vehicle to convert generated impact energy into deformation work in the event of a collision with an obstacle, so as to prevent or minimize damage to vehicle components, in particular the chassis, and thus to limit the amount of damage. The bumper structure includes a bumper beam which is secured transversely to the side rails of the vehicle frame, with crash boxes being installed between the bumper beam and the side rails. The bumper beam transmits energy caused by an impact into the crash boxes by which the impact energy is converted into deformation work. The bumper structure is hereby configured in such a way that the crash box seats substantially in midsection on the side rail and impact energy is transmitted via the bumper beam into the crash boxes and thus into the side rails at smallest possible bending moment. Crash boxes are oftentimes screwed to the side rails via flange plates.

It would be desirable and advantageous to provide an improved crash box to obviate prior art shortcomings.

SUMMARY OF THE INVENTION

According to one aspect of the present invention, a crash box for installation between a bumper beam and a side rail of a motor vehicle includes an outer tube, and an inner tube held inside the outer tube, with the outer and inner tubes being movable in relation to one another, wherein at least one of the inner and outer tubes is provided with a coat of varnish at least in a contact area between the outer pipe and the inner pipe.

According to another feature of the present invention, the varnish may be applied through an electrochemical process such as a cathodic dip coating. The coating or varnish may also be made of coating powder.

A crash box according to the invention renders the application of a lubricant between the inner and outer tubes superfluous as a result of the application of the varnish coating in the contact zone between the inner and outer tubes as separation agent and lubricant. At least one of the inner and outer tubes is coated before assembly, suitably by means of cathodic dip coating or powder coating. All or only some areas of the inner and/or outer tubes may be coated. This is advantageous for subsequent joining operations, for example when welding the crash box to the bumper beam.

Tests have shown that the coating, in particular a cathodic dip coating, in the event of an impact at high speeds does not chip off like at slow deformation speeds but rather remains well-attached and separates. As a result, the coefficient of friction is kept at a constant level with no pick-up. Moreover, the coating inhibits or prevents corrosion.

According to another feature of the present invention, the outer pipe may be made of hardened steel material. This results in combination with the coat of varnish in an increase in the energy absorption of the crash box. The outer tube of high-strength hardened steel is disposed in surrounding relationship to the inner tube at least in an area or length section thereof. The coat of varnish provides hereby a separation between the inner and outer tubes. The outer tube assumes hereby the function of a shaping tool by which the inner tube is pushed through or displaced in the event of an impact. A displacement of the inner tube by the outer tube causes the inner tube to deform and to thereby reduce the impact energy. As it is made of hardened steel, the outer tube can as a whole be sized compact or shorter or made of a thinner material than the inner tube. This results in weight saving and contributes to an increase in the energy absorption of the overall bumper structure.

The weight reduction is especially beneficial when front bumpers are involved because vehicles with front motor are already heavy on the front axle as far as driving dynamics are concerned, which is compounded by the fact that the front bumper is located even further to the front of the vehicle than the axle. This problem is addressed by a crash box according to the present invention which allows maximum energy absorption while keeping density to a minimum. The inner tube is deformed completely or almost completely to the limits of the deformation capability, without encountering cracks in the material.

The outer tube assuming the function of a deforming tool is constructed for minimal elastic deflection radially outwards when subjected to stress during deformation of the inner tube. Therefore, a hardened steel material is used which has great strength in relation to density and little tendency to plastically change its shape.

According to another feature of the present invention, the outer tube may have a 0.2% yield strength $Rp_{0.2}$ of greater than or equal to 550 N/mm². Currently preferred is a 0.2% yield strength $Rp_{0.2}$ of greater than or equal to 800 N/mm².

According to another feature of the present invention, a flange plate may be attached to the outer tube and made of hardened steel material. The flange plate is provided for direct or indirect attachment or securement of the crash box to the side rail. The flange plate may also be made of hardened steel with a 0.2% yield strength $Rp_{0.2}$ of greater than or equal to 550 N/mm². Currently preferred is a 0.2% yield strength $Rp_{0.2}$ of greater than or equal to 800 N/mm².

According to another feature of the present invention, the flange plate and the outer tube may form a single-piece construction. As an alternative, the flange plate may be joined to the outer tube.

In the event of an impact, the inner tube shifts within the outer tube. The wall of the inner tube is hereby deformed by the outer tube to reduce or convert the impact energy. The existing installation space in the bumper structure can be utilized in an optimum manner by arranging the outer tube and the length portion of the inner tube received in the outer tube inside a side rail of the motor vehicle, wherein the crash box is hereby supported on the side rail via the flange plate.

According to another feature of the present invention, the inner tube may be made of steel material. Currently preferred is non-hardened steel with ductile properties. As an alternative, the inner tube may also be made of light metal material. Examples of light metal include aluminum or magnesium. Using light metal further reduces weight.

In order to still further reduce weight, the outer tube may have a wall thickness which is sized thinner than a wall thickness of the inner tube.

According to another feature of the present invention, the inner tube may have at least one length portion which is formed with a circumferential constriction, with the outer tube including a structure which engages the constriction. Suitably, the constriction extends in the form of a ring over the entire circumference of the inner tube. The structure may involve one or more dimples which are formed from the wall of the outer tube. The dimple may extend in the form of a ring over the entire circumference of the outer tube. Of course, the outer tube may include several calotte-shaped dimples in circumferential spaced-apart relationship about a reference circle.

According to another feature of the present invention, the inner and outer tubes may bear in flat contact upon one another across a contact zone between the inner and outer tubes. As an alternative, the inner and outer tubes may define an overlap zone in which a ring-shaped open space is provided without any contact between the inner and outer tubes. As viewed in insertion direction of the inner tube, the open space is situated anteriorly of the contact zone between the inner and outer tubes. Depending on the constructive design of the contact zone and the surfaces contacting during displacement of the inner tube and the chronological sequence of contact, the force pattern can be evened out during deformation of the inner tube.

During displacement of the inner tube within the outer tube, stress is at a maximum in the area of the contraction or constriction in the inner tube as a result of tangential tensile stress. Sizing the wall thickness of the outer tube in accordance with the encountered stress would however result in overdimensioning of other areas of the outer tube, especially such areas which normally resist predominantly axial tensile stress. To save weight, a reinforcement may be attached, at least to a portion of the outer tube. The reinforcement may be an armoring, such as a fiber reinforcement or fiber composite reinforcement on the basis of plastic, ceramic or metal fiber material. Currently preferred is the attachment of the reinforcement to an outer side of the outer tube in an area of the structure. The placement of a reinforcement in the form of a radial winding of fiber composite in the area of the structure on the outer perimeter of the outer tube is currently considered very beneficial because the fibers can be subjected to tensile stress.

Of course, a reinforcement of the hardened outer tube in the form of separate reinforcing components or a variation of the wall thickness may also be conceivable.

According to another feature of the present invention, the inner and outer tubes may have conically widening ends, in particular at the side rail proximal end. This enhances side stiffness of the crash box and the resistance to tensile stress can be improved, for example during towing of a motor vehicle.

According to another feature of the present invention, the inner tube may have a side rail proximal end in the form of a collar which may embrace a side rail proximal end of the outer tube. This, too, enhances stability of the crash box. Suitably, the collar forms the abutment for encountered tensile forces, for example during towing operation.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

This is one of two applications both filed on the same day. Both applications deal with related inventions. They are commonly owned and have the same inventive entity. Both applications are unique. Accordingly, the following U.S. patent application, claiming priority of German Patent Application, Serial No. 10 2008 015 890.9, filed Mar. 26, 2008, pursuant to 35 U.S.C. 119(a)-(d), and entitled "CRASH BOX" is hereby expressly incorporated by reference.

Figure 1:
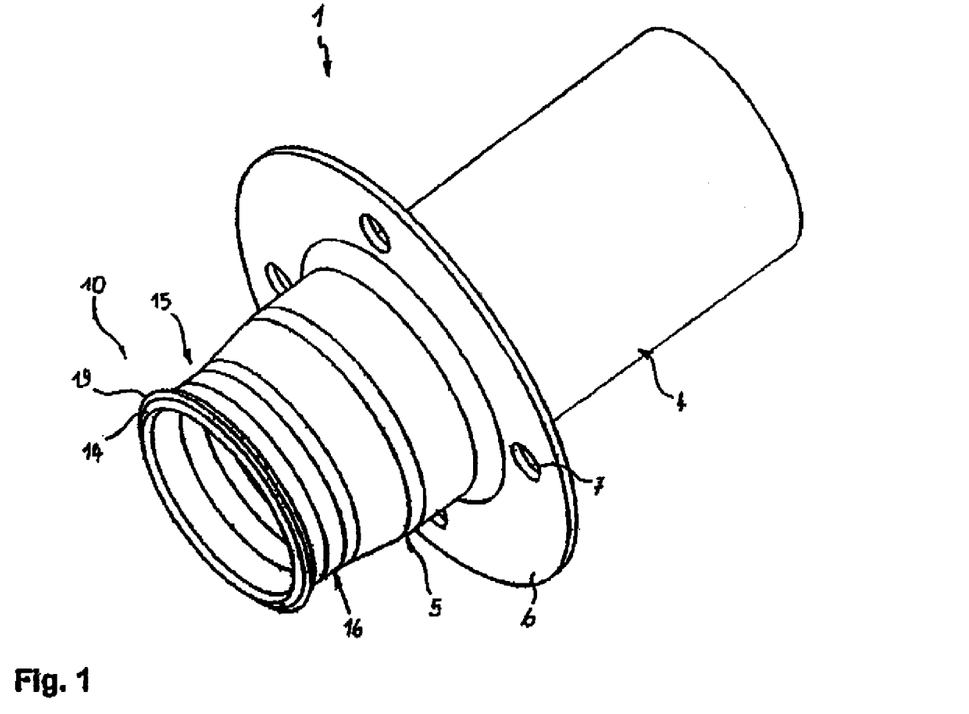
FIG. 1 is a perspective illustration of a first embodiment of a crash box according to the present invention.

Turning now to the drawing, and in particular to FIG. 1, there is shown a perspective illustration of a first embodiment of a crash box according to the present invention, generally designated by reference numeral 1, for installation within an unillustrated bumper of a motor vehicle between a side rail 2, indicated by dashed line only, of a vehicle body and a bumper beam 3, so as to be useful as an energy-absorbing deformation element.

Figure 2:
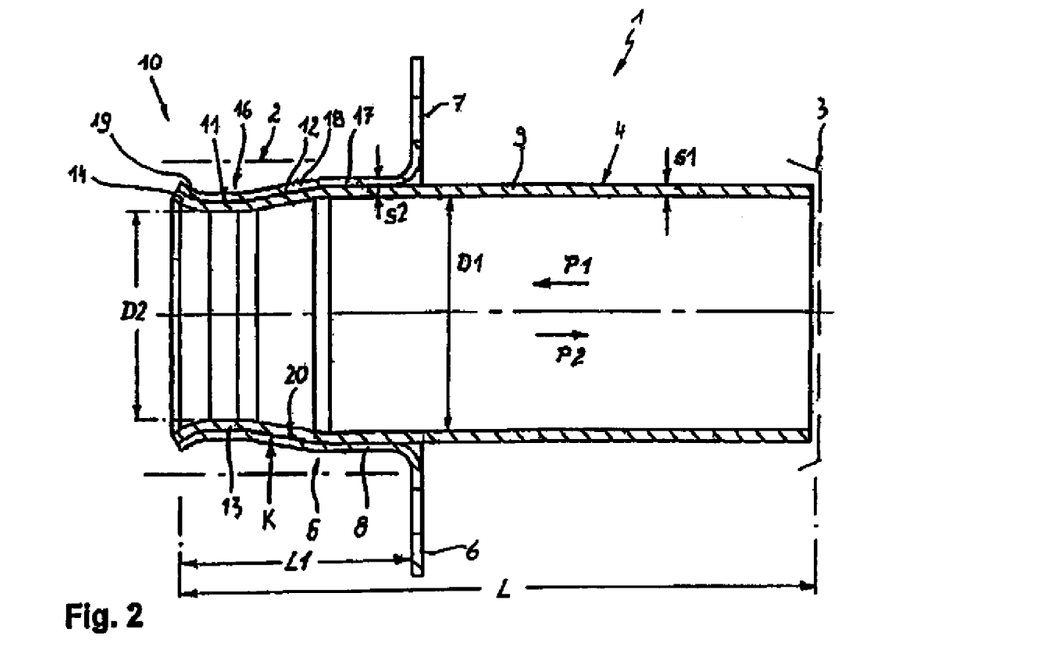
FIG. 2 is a longitudinal section of the crash box of FIG. 1.

As shown in particular in FIG. 2 which is a longitudinal section of the crash box 1, the crash box 1 includes an inner tube 4 and an outer tube 5 which surrounds the inner tube 4 about a length portion L1 of its length L. The inner tube 4 is held inside the outer tube 5 and movable in relation to the outer tube 5. Arrow P1 designates the impact direction within a motor vehicle.

The outer tube is formed in one piece on its side proximal to the bumper beam 3 with a flange plate 6 which has a circular configuration and is provided with mounting bores 7 for securement of the crash box 1 to the side rail 2. The outer tube 5 is arranged inside the side rail 2 and rests with the flange plate 6 against the end surface of the side rail 2.

As can be seen from FIG. 2, the outer tube 5 has a wall 8 of a thickness which is sized thinner than a wall thickness of the wall 9 of the inner tube 4. The wall thickness of the wall 9 is designated with reference sign s1, whereas the wall thickness of the wall 8 is designated with reference sign s2.

The inner tube 4 is configured on its side rail proximal end 10 in the area of the length portion L1 with reduced diameter to have a constriction 11 which extends circumferentially in the form of a ring. The diameter decreases from a diameter D1, representing the general diameter of the inner tube 4, to a diameter D2 in the area of the constriction 11. The constriction 11 has a conically tapering length portion 12 and a cylindrical length portion 13 which is extended by a conical expansion 14 towards the side rail proximal end 10. The contour of the outer tube 5 conforms to the contour of the constriction 11 so that the outer tube 5 bears in full contact upon the inner tube 4 in a contact zone K between the inner tube 4 and the outer tube 5 along the length portion L1.

The wall 8 of the outer tube 5 has a structure 15 in the form of an inwardly directed circumferential dimple 16 which engages the constriction 11 of the inner tube 4. The outer tube 5 has a cylindrical length portion 17 which extends from the flange 6 towards the side rail proximal end 10 of the inner tube 4 and continues to the cylindrical dimple 16 via a conically tapering length portion 18. The dimple 16 is followed by a conical expansion 19 which bears upon the outside of the conical expansion 14 of the inner tube 4 in surrounding relationship thereto. The expansion 14 of the inner tube 4 and the expansion 19 of the outer tube 5 hold the inner tube 4 in place within the outer tube 4 when subjected to tensile forces in a direction of arrow P2, for example during towing operation.

The outer tube 5 is made of high-strength, hardened steel material which has a 0.2% yield strength $Rp_{0.2}$ of greater than or equal to 550 N/mm². Currently preferred is a 0.2% yield strength $Rp_{0.2}$ of greater than or equal to 800 N/mm². The flange 6 which is connected in a one piece to the outer tube 5 is made of a same hardened steel material with same material properties.

The inner tube 4 is made of non-hardened steel material with plastic deformation capability and high yield point. The inner tube 4 may also be made of light metal, such as aluminum or magnesium.

The inner tube 4 is provided, at least in the contact zone K, with a coating 20 in the form of a varnish layer, applied by cathodic dip coating. The varnish coating 20 assumes the function as a separation and lubricant layer in the contact zone K between the inner tube 4 and the outer tube 5 and positively affects the deformation of the inner tube 4, when being displaced by the outer tube 5 because the varnish coating 20 maintains the coefficient of friction at a constant level. Moreover, the varnish coating 20 prevents corrosion.

The coat of varnish 20 is applied upon the inner tube 4 before the inner tube 4 and the outer tube 5 are joined together and assembled to form the crash box 1. Of course, the outer tube 5 may also be provided with a varnish coating 20 in the contact zone K before the inner tube 4 and the outer tube 5 are joined together. The varnish coating 20 assumes generally a separation function between the inner tube 4 and the outer tube 5.

Figure 3:
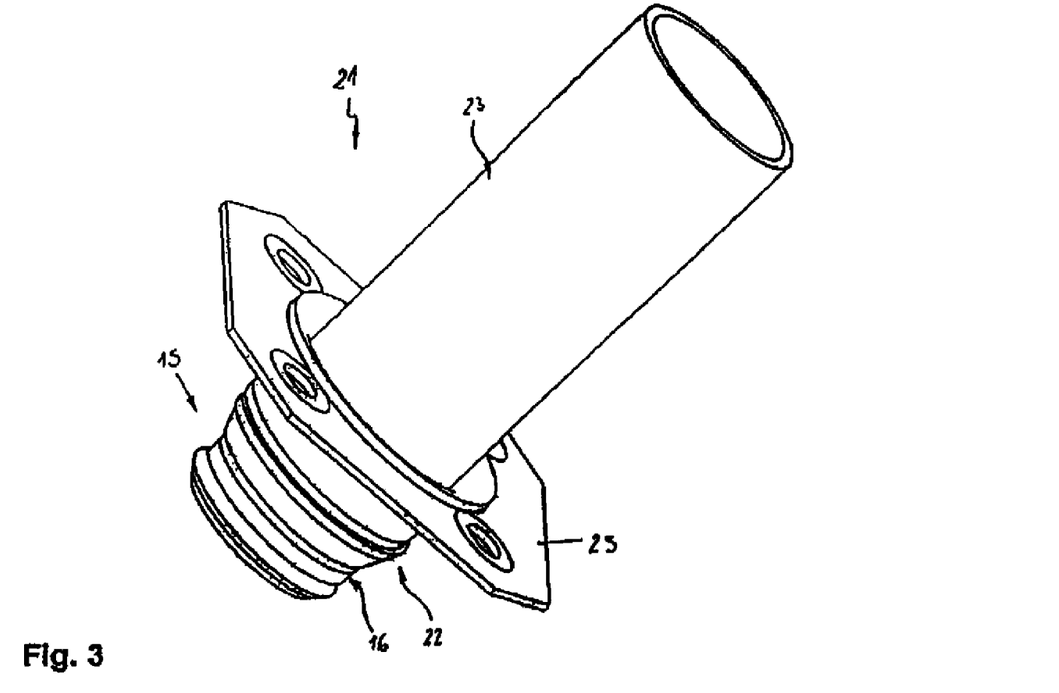
FIG. 3 is a perspective illustration of a second embodiment of a crash box according to the present invention.

FIG. 3 shows a perspective illustration of a second embodiment of a crash box according to the present invention, generally designated by reference numeral 21. Parts corresponding with those in FIG. 1 are denoted by identical reference numerals and not explained again. The crash box 21 has basically a same configuration as the afore-described crash box 1 and includes an inner tube 23 held in an outer tube 22 and movable in relation to the outer tube 22. The displacement of the inner tube 23 in the event of an impact in a direction of arrow P1 results in a deformation of the inner tube 23 by the outer tube 22 which operates as a shaping tool. In this way, impact energy is converted into deformation energy and reduced.

The inner tube 23 is made of steel material or a light metal, in particular aluminum or magnesium.

The outer tube 22 is made of hardened steel material.

Figure 4:
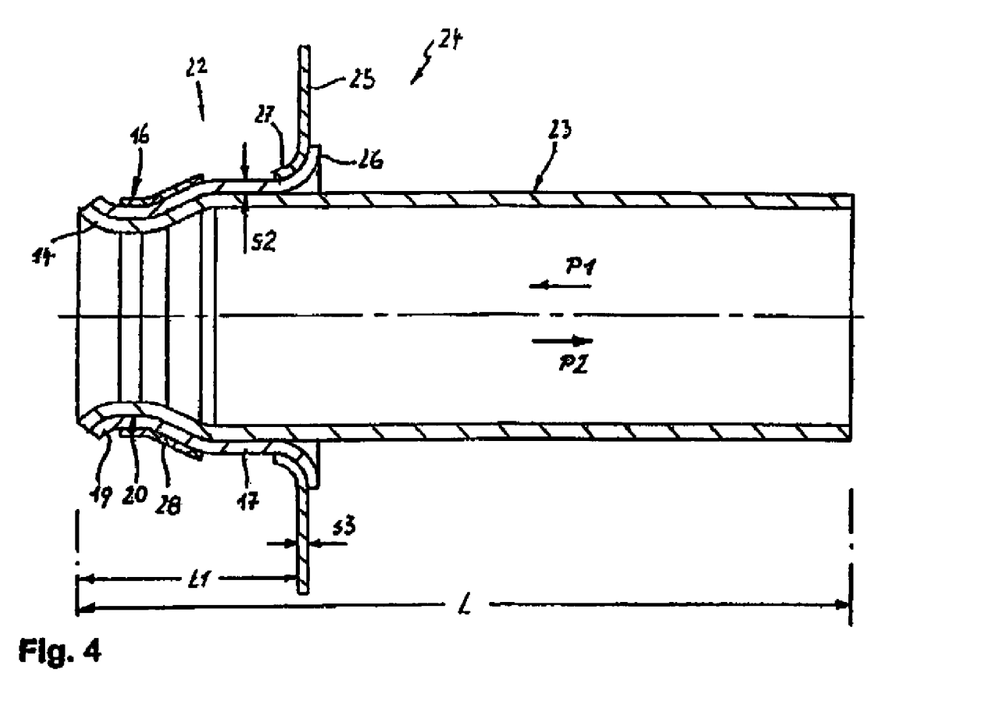
FIG. 4 is a longitudinal section of the crash box of FIG. 3.

A flange 25 is attached, e.g. welded, to the bumper beam proximal end 24 of the outer tube 22, with the outer tube 22 being provided on its bumper beam proximal end 24 with an outwardly turned collar 26 for support of an inwardly directed ring-shaped border 27 of the flange 25. This is shown in FIG. 4, which is a perspective illustration of the crash box 21. The flange 25 is joined in this area with the outer tube 22. The flange 25 has a wall thickness s3 which is thinner than the wall thickness s2 of the outer tube 22 by about ⅓. This results in added weight saving.

The outer tube 22 and/or the inner tube 23 is/are provided with a coat 20 of varnish at least in the contact zone K.

The crash box 21 is partially provided on the outside in the area of the structure 15 and dimple 16 with a reinforcement 28 which can be made from a winding of a fiber material, e.g. carbon fiber reinforced plastic. Of course, the reinforcement 28 may also be implemented as metal part, e.g. in the form of a tightening strap, which embraces the outer tube 22 in the area of the dimple 16. The reinforcement 28 may be joined with the outer tube 22. For example, the reinforcement 28 may be bonded or welded to the outer periphery of the outer tube 22.

Figure 5:
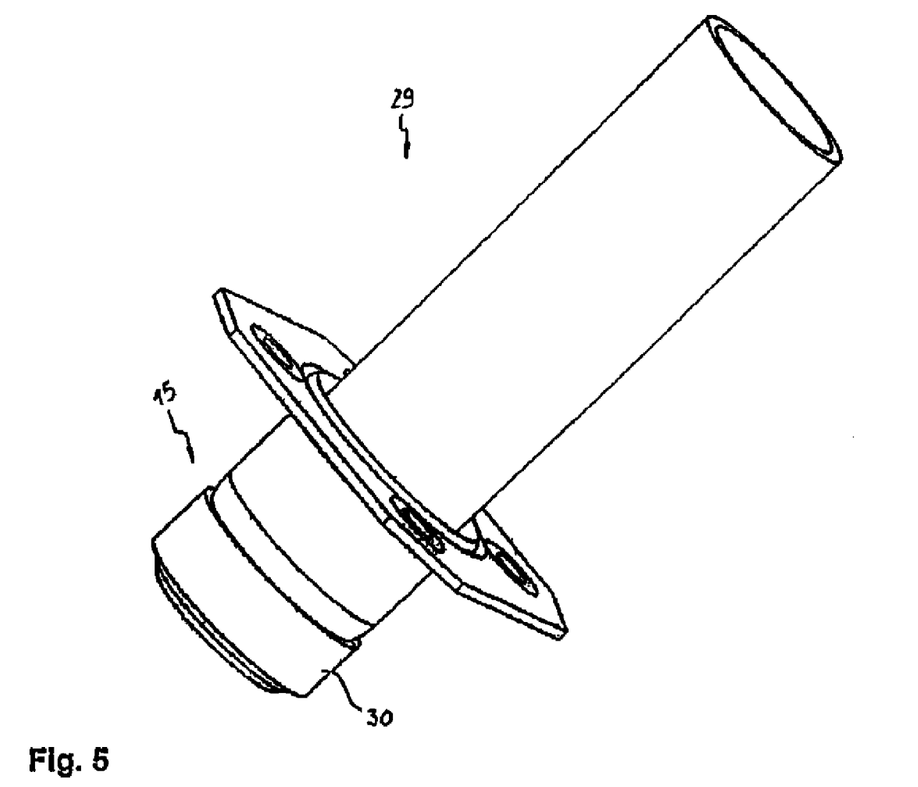
FIG. 5 is a perspective illustration of a third embodiment of a crash box according to the present invention.
Figure 6:
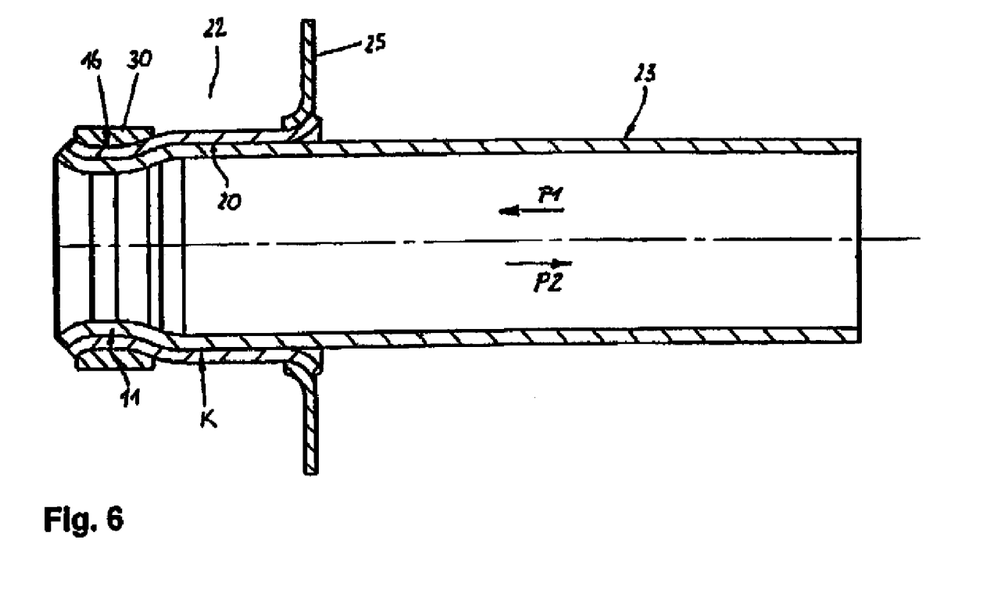
FIG. 6 is a longitudinal section of the crash box of FIG. 5.

FIG. 5 shows a perspective illustration of a third embodiment of a crash box according to the present invention, generally designated by reference numeral 29. Parts corresponding with those in FIGS. 1 and 3 are denoted by identical reference numerals and not explained again. The description below will center on the differences between the embodiments. In this embodiment, provision is made for a reinforcement 30 in the form of a hardened ring-shaped steel ring which surrounds the outer tube 22 in the area of the structure 15 and dimple 16. This is also shown in FIG. 6 which is a longitudinal section of the crash box 29. The outer tube 22 is made of a steel material, whereas the inner tube 23 is made in particular of light metal. A varnish coating 20 is again applied in the contact zone K between the outer tube 22 and the inner tube 23.

Figure 7:
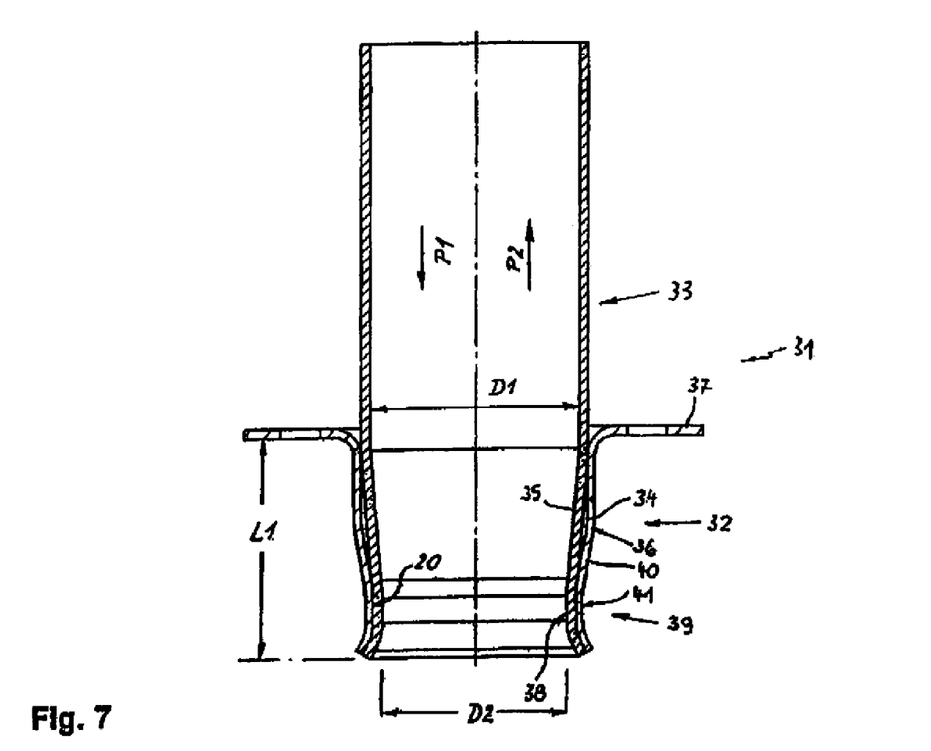
FIG. 7 is a longitudinal section of a fourth embodiment of a crash box according to the present invention.

FIG. 7 shows a longitudinal section of a fourth embodiment of a crash box according to the present invention, generally designated by reference numeral 31. Parts corresponding with those in FIGS. 1-5 are denoted by identical reference numerals and not explained again. The description below will center on the differences between the embodiments. In this embodiment, the crash box 31 has an inner tube 33 and an outer tube 32 which is configured in such a way that it does not surround the inner tube 33 in full contact in the length portion L1. Rather, a ring-shaped circumferential open space 34 is provided between the outer tube 32 and the inner tube 33 in the overlap zone, i.e. in the length portion L1. The open space 34 is provided between the conically tapering length portion 35 of the inner tube 33 and the flange-proximal length portion 36 of the outer tube 32. In other words, a full contact between the outer tube 32 and inner tube 33 is provided only in the area of the flange 37 and in the area of the constriction 38 and the structure 39. The cylindrical length portion 36 of the outer tube 32 is sized longer and connects to the dimple 41 via a shorter but steeper conical length portion 40. In the event of an impact in arrow direction P1, the inner tube 33 is displaced by the engagement of structure 39 and dimple 41 in the outer tube 32. The inner tube 33 has a diameter which expands from diameter D2 in the area of the constriction 38 to the full diameter D1 on the bumper beam proximal end 42 of the inner tube 33. As a consequence of the increase in diameter and the resultant slow buildup of the deformation force, the so-called adherence peak or initial force peak can be reduced or eliminated in the overall force pattern.

The outer tube 32 is made of hardened steel material, while the inner tube 33 is made of a comparably softer metal, e.g. a steel or light metal. A varnish coating 20 is applied on the outer tube 32 and/or inner tube 33 at least on those surfaces that are in contact with one another.

Figure 8:
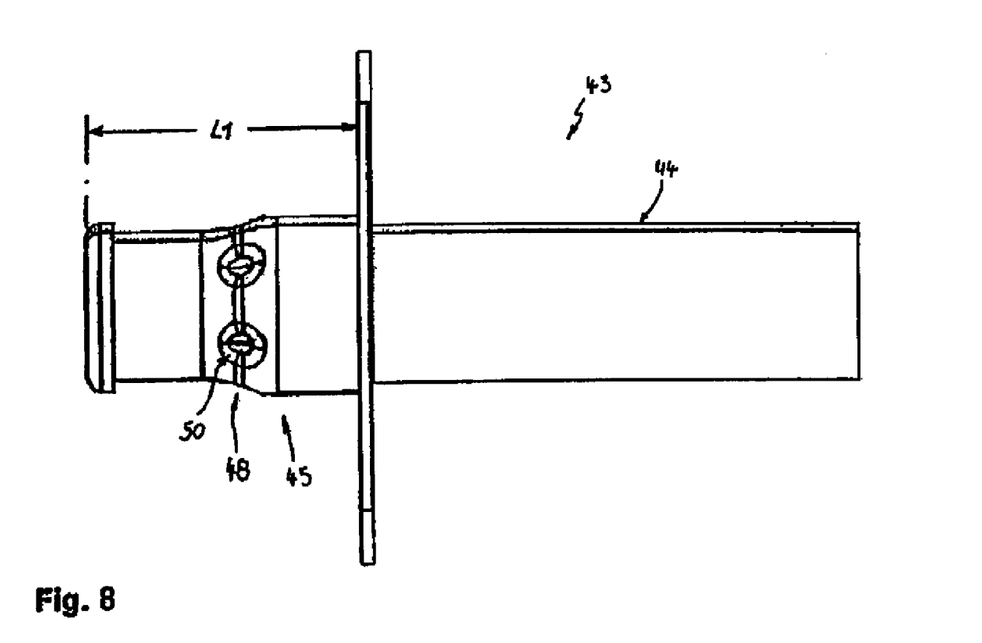
FIG. 8 is a side view of a fifth embodiment of a crash box according to the present invention.
Figure 9:
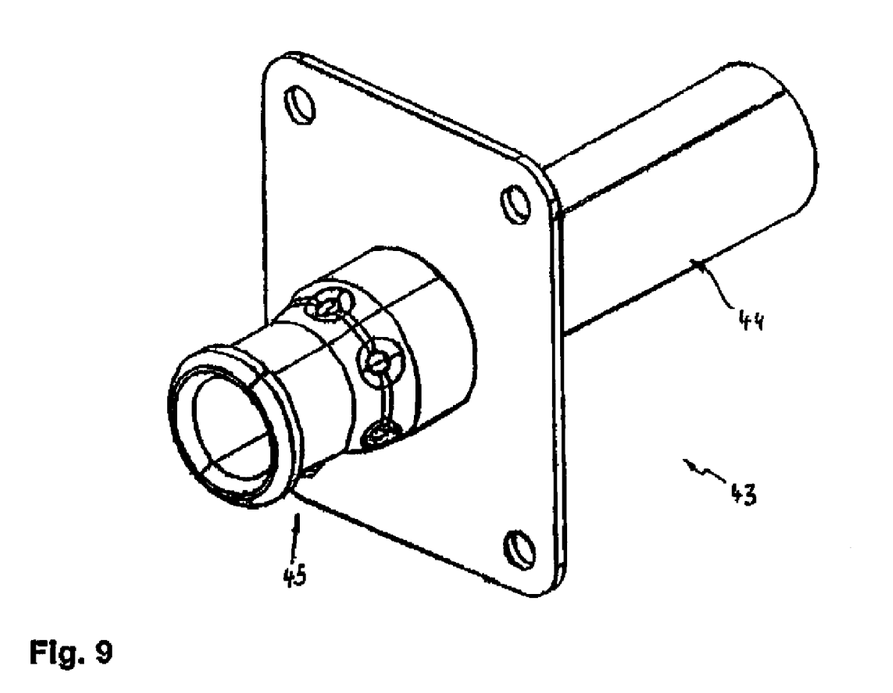
FIG. 9 is a perspective illustration of the crash box of FIG. 8.

Referring now to FIGS. 8 and 9, there are shown side and a perspective views of a fifth embodiment of a crash box according to the present invention, generally designated by reference numeral 43. Again, parts corresponding with those in FIGS. 1-7 are denoted by identical reference numerals and not explained again. The crash box 43 includes an inner tube 44 and an outer tube 45, with the inner tube 44 being movable within the outer tube 45 in arrow direction P1. The outer tube 45 includes a flange 46 for direct or indirect attachment to a side rail of a motor vehicle.

The inner tube 44 is guided in the outer tube 45 along a length portion L1 of the length L of the inner tube 44. The length portion L1 of the inner tube 44 like the one of the outer tube 45 is arranged within the side rail of the motor vehicle. As shown in particular in FIG. 10, which is a simplified schematic longitudinal section of the crash box 43, the inner tube 44 is reduced in diameter in the length portion L1 by a circumferential constriction 47. Structures 48 are provided on the outer tube 45 for engagement in the constriction 47. Each structure 48 is formed by an inwardly directed calotte-shaped dimple 50 from the wall 49 of the outer tube 45. The structures 48 are arranged in spaced-apart relationship about a reference circle about the circumference of the outer tube 45. The wall 51 of the inner tube 44 becomes deformed in the area of the dimples 50, when the inner wall 44 is displaced by the outer tube 45, so as to convert impact energy into deformation energy.

Figure 10:
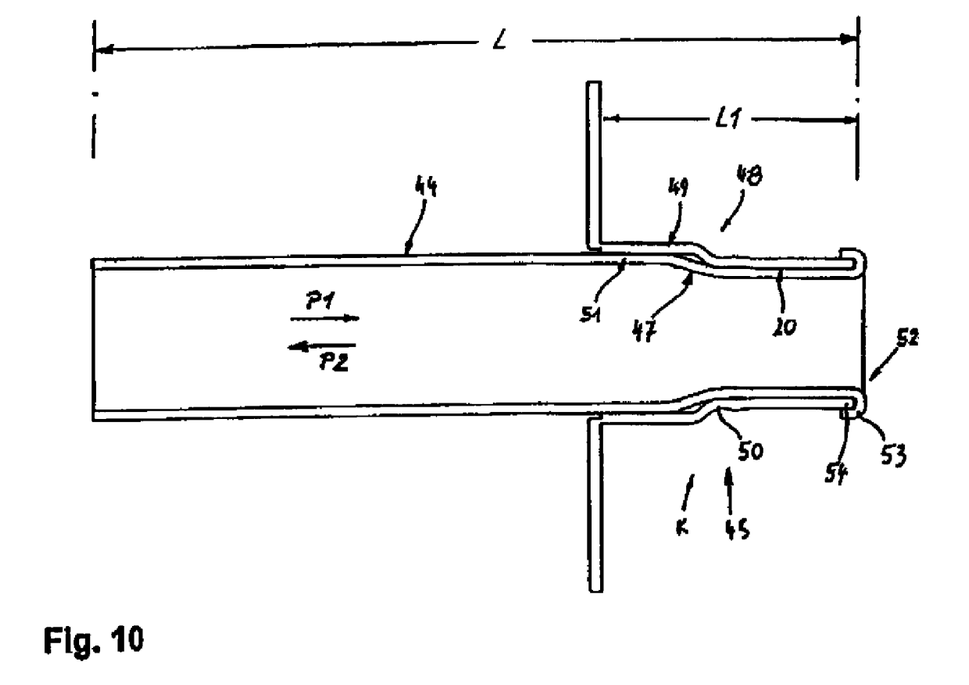
FIG. 10 is a simplified schematic longitudinal section of the crash box of FIGS. 8 and 9.

The inner tube 44 has a side rail proximal end 52 which is formed with a circumferential collar 53 in surrounding relationship to the side rail proximal end 54 of the outer tube 45. The side rail proximal end 52 of the inner tube 44 assumes thus the function of an abutment for tensile forces acting in arrow direction P2, for example during towing operation.

As in most embodiments, also the outer tube 45 of the crash box 43 is made of hardened steel material which has a 0.2% yield strength $Rp_{0.2}$ of greater than or equal to 550 N/mm². Currently preferred is a 0.2% yield strength $Rp_{0.2}$ of greater than or equal to 800 N/mm². The inner tube 44 is made of steel material or light metal, in particular aluminum. A varnish coating 20 is applied in the contact zone K between the inner tube 44 and the outer tube 45 to assume a separation function which positively affect friction processes during displacement of the inner tube 44 in the outer tube 45 and the deformation of the inner tube 44.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A crash box for installation between a bumper beam and a side rail of a motor vehicle, comprising:
   an outer tube made in its entirety of hardened steel material; and
   an inner tube held inside the outer tube, with the outer and inner tubes being movable in relation to one another, wherein at least one of the inner and outer tubes is provided with a coat of varnish at least in a contact area between the outer tube and the inner tube, said coat of varnish maintaining a constant coefficient of friction in the contact area between the outer and inner tubes.

2. The crash box of claim 1, wherein the outer tube has a 0.2% yield strength $R_{p0.2}$ of greater than or equal to 550 N/mm².

3. The crash box of claim 1, wherein the outer tube has a 0.2% yield strength $R_{p0.2}$ of greater than or equal to 800 N/mm².

4. The crash box of claim 1, further comprising a flange plate attached to the outer tube and made of hardened steel material.

5. The crash box of claim 4, wherein the flange plate is made in one piece with the outer tube.

6. The crash box of claim 4, wherein the flange plate is joined to the outer tube.

7. The crash box of claim 1, wherein the inner tube is made of steel.

8. The crash box of claim 1, wherein the inner tube is made of light metal.

9. The crash box of claim 1, wherein the outer tube has a wall thickness sized thinner than a wall thickness of the inner tube.

10. The crash box of claim 1, wherein the inner tube has at least one length portion formed with a circumferential constriction, said outer tube including a structure which engages the constriction.

11. The crash box of claim 10, wherein the structure is formed as a dimple directed inwardly from a wall of the outer tube.

12. The crash box of claim 1, further comprising a reinforcement attached to a portion of the outer tube.

13. The crash box of claim 12, wherein the outer tube has a structure to engage the inner tube, said reinforcement being attached to an outer side of the outer tube in an area of the structure.

14. The crash box of claim 1, wherein the inner and outer tubes have one end which is conically widened.

15. The crash box of claim 1, wherein the outer tube is arranged within a side rail.

16. The crash box of claim 1, wherein the inner tube has a side rail proximal end in the form of a collar which embraces a side rail proximal end of the outer tube.

17. The crash box of claim 1, wherein the inner and outer tubes abut one another in full contact across a contact zone between the inner and outer tubes.

18. The crash box of claim 1, wherein the inner and outer tubes define an overlap zone in which a ring-shaped open space is provided between the inner and outer tubes.

19. A method of making a crash box, comprising the steps of:
coating at least one of two tubes with varnish; and
securing an inner one of the tubes within an outer one of the tubes in a manner as to allow a movement between the outer and inner tubes, with the outer one of the tubes being made in its entirety of hardened steel material and with the varnish maintaining a constant coefficient of friction in the contact area between the outer and inner tubes.

20. The method of claim 19, wherein the coat of varnish is applied through an electrochemical process.

21. The method of claim 20, wherein the electrochemical process is a cathodic dip coating process.

22. The method of claim 19, wherein the varnish is coating powder.

23. The method of claim 19, wherein the inner one of the tubes only is coated with varnish.

* * * * *